No Printed Specification Available
E. Hotchkiss.
918X
Straw Cutter.
Patented Aug. 2. 1808.
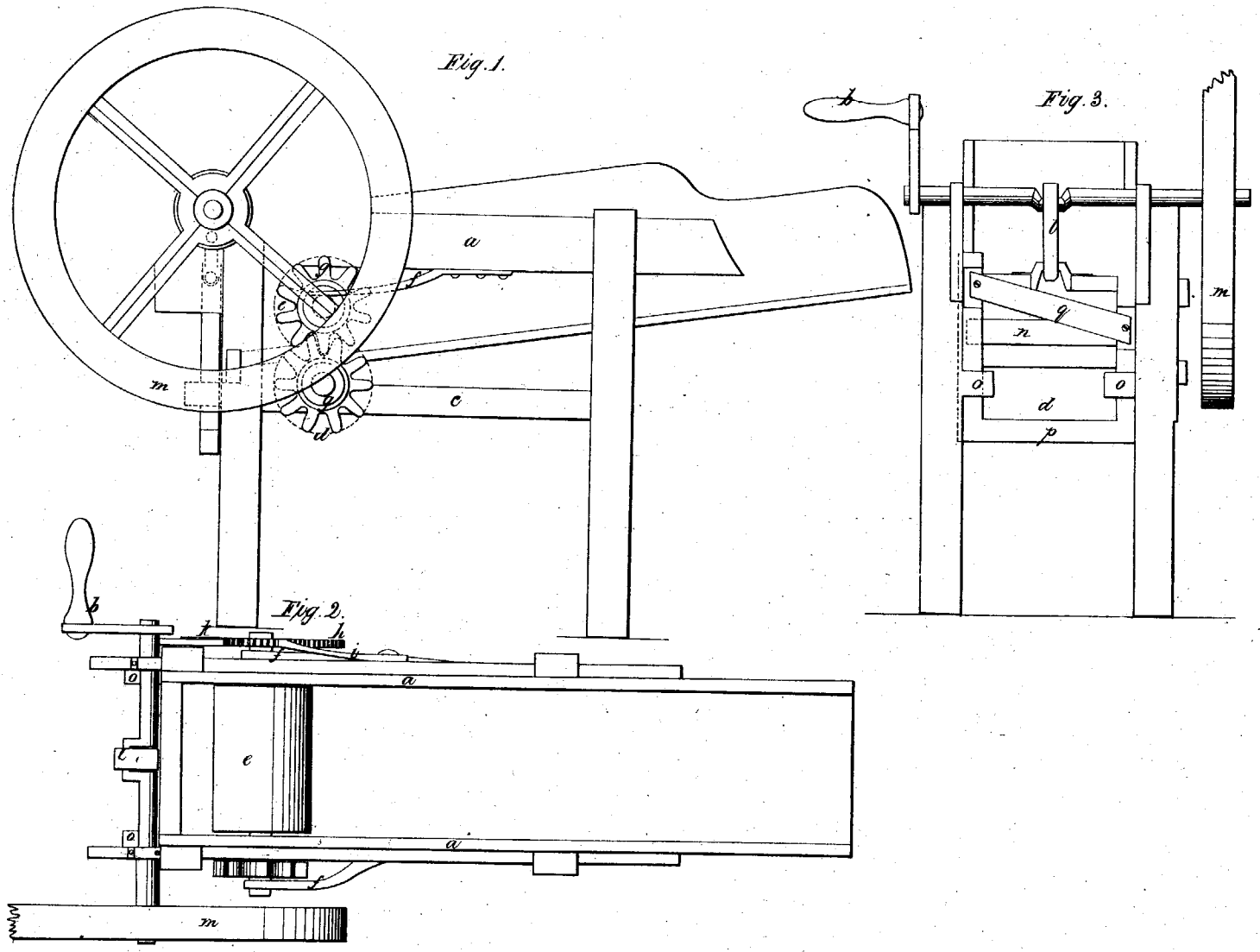

918x Aug 2 1808

Elihu Hotchkiss.

Letters Patent Issued Aug. 2. 1808.

The Schedule referred to in these Letters Patent and making part of the same containing a description in the words of the said Elihu Hotchkiss himself of his Machine for cutting Straw.

The frame is composed of scantling or stit work three inches by four. three feet high by three feet in length. and fifteen inches wide from inside to in side. The plates project six inches in front. On the top of the projection is placed the crank crosswise of the frame. The side girths are framed into the posts six inches below the plates. under which 5 inches from the front posts is placed. The lower or bed cylinder and is confined by a Box at each end for the gudgeon to turn in. The upper cylinder has its boxes to turn in cut through the sides of the straw Box. in such a manner as to rise or sink according to the quantity of straw in the Box. and is kept to a proper bearing or pressure on the straw by springs placed over the gudgeon and fastened to the underside of the plates. On one end of both cylinders outside of the straw Box. are fastened cog wheels containing ten spur cogs each two inches in length out of the rim of the wheels which are five inches and a half diameter. each cylinder within the straw Box is seven inches in diameter. the under one is operated upon or put in motion by the upper one by means of a ragletheel like those in common looms. with a holding and feeding hand. The feeding hand is made with a joint which effects the rolling of the cylinders by the rising of the knife gate. and the gate rises by turning the crank with a sweep or radius of 12 Inches. Again the centre of the knife gate is a square bend in the shaft of the crank of 2½ inches which raises the gate 5 inches by a pitman extended from the shaft to the lower part of the gate. On the opposite end of the crank shaft is a balance wheel three feet in diameter. with four arms and the felloys three inches wide and three inches thick. Directly under the lower girth in front to which is fastened the Bed knife. is the lower gate hook and the other is formed by a groove in the plate. the upper knife is secured to the lower girth in the gate. sloping two inches in thirteen. The operation

918X of the knives in cutting straw is similar to that of Shears. or the Guillotine
and the straw is conveyed to the knives by the rolling of the cylinders.
The Bottom or floor of the Box that contains the straw is an inclined plane
of 8 inches in five feet. The sides are thirteen or fourteen inches wide
at the gate and 9 inches at the other end are five feet long and thirteen
inches wide

[illegible] Witnesses Elihu Hotchkiss
[illegible] Stephen Greenleaf
Samuel Elliot. [illegible] made by [illegible] 841.

[illegible]